US012337887B2

(12) United States Patent
Jiang

(10) Patent No.: US 12,337,887 B2
(45) Date of Patent: Jun. 24, 2025

(54) FOLDABLE TROLLEY WITH CONVENIENT FOLDING STRUCTURE

(71) Applicant: Chuntao Ma, Zhongshan (CN)

(72) Inventor: Zelian Jiang, Zhongshan (CN)

(73) Assignee: Chuntao Ma, Zhongshan (CN)

( * ) Notice: Subject to any disclaimer, the term of this patent is extended or adjusted under 35 U.S.C. 154(b) by 350 days.

(21) Appl. No.: 18/184,737

(22) Filed: Mar. 16, 2023

(65) Prior Publication Data
US 2023/0219608 A1   Jul. 13, 2023

(30) Foreign Application Priority Data

Mar. 17, 2022   (CN) .......................... 202220592769.7

(51) Int. Cl.
*B62B 3/02*   (2006.01)
(52) U.S. Cl.
CPC ..................... *B62B 3/025* (2013.01)
(58) Field of Classification Search
CPC ........... B62B 3/025; B62B 3/02; B62B 3/007; B62B 3/027
See application file for complete search history.

(56) References Cited

U.S. PATENT DOCUMENTS

| 5,915,723 A * | 6/1999 | Austin ...................... B62B 3/02 280/47.35 |
| 9,896,118 B2 * | 2/2018 | Choi ........................ B62B 3/007 |
| 10,464,588 B1 * | 11/2019 | Lin ........................... B62B 7/08 |
| 11,091,183 B2 * | 8/2021 | Wu .......................... B62B 3/007 |
| 11,465,664 B1 * | 10/2022 | Choi ........................ B62B 3/025 |
| 11,772,698 B2 * | 10/2023 | Cui ........................... B62B 7/008 280/650 |
| 11,981,364 B2 * | 5/2024 | Ma .......................... B62B 5/0461 |
| 2003/0009853 A1 * | 1/2003 | Kuo ........................ A45C 13/262 16/405 |
| 2017/0259838 A1 * | 9/2017 | Choi ........................ B62B 3/007 |
| 2022/0055676 A1 * | 2/2022 | Cui .......................... B62B 7/062 |
| 2023/0242168 A1 * | 8/2023 | Clemmer ................ B62B 3/007 280/651 |

FOREIGN PATENT DOCUMENTS

| CN | 105416355 A | 3/2016 |
| CN | 205168581 U | 4/2016 |
| CN | 205440487 U | 8/2016 |
| KR | 20160118839 A | * 10/2016 ............... B62B 7/06 |

* cited by examiner

*Primary Examiner* — Steve Clemmons

(57) ABSTRACT

The present invention discloses a foldable trolley with convenient folding structure, comprising an tipper folding frame, a lower folding frame and a supporting rod assembly. Sliding ends of both the front and rear sliding upright rods slide closely or backwardly as the lower folding frame is folded or expanded, thus to form a triangular support arm structure, thereby strengthening the stability of overall structure. Besides, a folding lock-release mechanism is provided, when the foldable frame is expanded, the front and rear locking assemblies thereof respectively limit the front and rear sliding upright rods to slide; when the foldable frame is folded, the front and rear locking assemblies release limitation of the front and rear sliding upright rods respectively through the unlocking assembly. The foldable frame can be folded by simply lifting the upper connecting rod up, thus one key locking or unlocking is achieved, and the operation is convenient.

8 Claims, 5 Drawing Sheets

FOLDABLE TROLLEY WITH CONVENIENT FOLDING STRUCTURE

CROSS-REFERENCE TO RELATED APPLICATIONS

The application claims priority to Chinese patent application No. 202220592769.7, filed on Mar. 17, 2022, the entire contents of which are incorporated herein by reference.

TECHNICAL FIELD

The present invention belongs to the technical field of trolleys, and particularly relates to a foldable trolley with convenient folding structure.

BACKGROUND in order to facilitate placement of trolleys, the trolleys that can be folded have been sold on the market at present. However, at present, foldable frames of most trolleys have insufficient support after being expanded, when heavy objects are placed or children are sitting thereon, the supporting rods are easily fractured, resulting in safety problems. In order to ensure the stability of the overall structure, foldable frames of the trolleys are configured as triangular support structures. Although the stability of the overall structure of the trolley is strengthened, the operations are complicated and inconvenient when being folded or expanded.

SUMMARY

The purpose of the present invention is to provide a foldable trolley With convenient folding structure, which has overall stable structure, good safety performance, and convenient operations when being folded or expanded.

The present invention is realized by the following technical solutions:

A foldable trolley with convenient folding structure, comprising a foldable frame and a folding lock-release mechanism, wherein the foldable frame comprises:
  an upper folding frame, which includes a front upper rod, a rear upper rod, and an upper connecting rod hinged with the front upper rod and the rear upper rod respectively;
  a lower folding frame, which includes a front lower rod, a rear lower rod, and a lower connecting rod hinged with the front lower rod and the rear lower rod respectively;
  a support rod assembly, which includes an intermediate upright rod arranged between the upper folding frame and the lower folding frame, and a front sliding upright rod and a rear sliding upright rod arranged on both sides of the intermediate upright rod respectively; wherein one end of the front sliding upright rod is hinged with the intermediate upright rod, and the other end, a front sliding end is slidably arranged on the front lower rod along a length direction of the front lower rod: one end of the rear sliding upright rod is hinged with the intermediate upright rod, and the other end, a rear sliding end is slidably arranged on the rear lower rod along a length direction of the rear lower rod,
  wherein the folding lock-release mechanism includes a front locking assembly for limiting the front sliding upright rod to slide along the length direction of the front lower rod, a rear locking assembly for limiting the rear sliding upright rod to slide along the length direction of the rear lower rod, and an unlocking assembly for unlocking the front locking assembly and the rear locking assembly.

The foldable trolley with convenient folding structure as described above, wherein the front locking assembly comprises:
  a first limiting member, which is arranged on the front lower rod for limiting the front sliding end of the front sliding upright rod to slide along the length direction away from the lower connecting rod;
  a second limiting member, which is arranged within the front lower rod, wherein one end of the second limiting member movably extends out of the front lower rod along a radial direction of the front lower rod for limiting the front sliding end of the front sliding upright rod to slide along the length direction close to the lower connecting rod;
  a first elastic element, which is arranged between the front lower rod and the second limiting member for pushing the second limiting member along the radial direction of the front lower rod, so that an extending end of the second limiting member is kept outside the front lower rod,
  when the lower folding frame is expanded, the front sliding end of the front sliding upright rod slides to a position between the first limiting member and the extending end of the second limiting member, thus to fix the front sliding end of the front sliding upright rod.

The foldable trolley with convenient folding structure as described above, wherein the rear locking assembly comprises:
  a third limiting member, which is arranged on the rear lower rod for limiting the rear sliding end of the rear sliding upright rod to slide along the length direction far away from the lower connecting rod;
  a fourth limiting member, which is arranged within the rear lower rod, wherein one end of the fourth limiting member movably extends out of the rear lower rod along a radial direction of the rear lower rod for limiting the rear sliding end of the rear sliding upright rod to slide along the length direction close to the lower connecting rod;
  a second elastic element, which is arranged between the rear lower rod and the fourth limiting member for pushing the fourth limiting member along the radial direction of the rear lower rod, so that an extending end of the fourth limiting member is kept outside the front lower rod,
  when the lower folding frame is expanded, the rear sliding end of the rear sliding upright rod slides to a position between the third limiting member and the extending end of the fourth limiting member, thus to fix the rear sliding end of the rear sliding upright rod.

The foldable trolley with convenient folding structure as described above, wherein the unlocking assembly comprises:
  a movable sleeve, which is movably arranged on the intermediate upright rod along a length direction of the intermediate upright rod;
  a front unlocking slider, which is movably arranged within the front lower rod along the length direction of the front lower rod, wherein the extending end of the second limiting member passes through the front unlocking slider and then extends out of the front lower rod, and the front unlocking slider is matched with the second limiting member by inclined wedge;

a front pulling wire, whose one end is connected with the movable sleeve, and the other end is connected with the front unlocking slider;

a third elastic element, which is arranged between the front unlocking slider and the front lower rod, wherein the third elastic element is compressed when the front unlocking slider moves along the length direction close to the lower connecting rod.

when the movable sleeve moves along a direction close to the upper folding frame, the front unlocking slider is pulled by the front pulling wire to move along the length direction close to the lower connecting rod, the front unlocking slider pushes the second limiting member to move along the radial direction of the front lower rod and to compress the first elastic element until the extending end of the second limiting member retracts back into the front lower rod, thus to release the limitation of the front sliding end of the front sliding upright rod sliding along the length direction close to the lower connecting rod.

The foldable trolley with convenient folding structure as described above, wherein the unlocking assembly further comprises:

a rear unlocking slider, which is movably arranged within the rear lower rod along the length direction of the rear lower rod, wherein the extending end of the fourth limiting member passes through the rear unlocking slider and then extends out of the rear lower rod, and the rear unlocking slider is matched with the fourth limiting member by inclined wedge;

a rear pulling wire, whose one end is connected with the movable sleeve, and the other end is connected with the rear unlocking slider;

a fourth elastic element, which is arranged between the rear unlocking slider and the rear lower rod, wherein the fourth elastic element is compressed when the rear unlocking slider moves along the length direction close to the lower connecting rod, when the movable sleeve moves along a direction close to the upper folding frame, the rear unlocking slider is pulled by the rear pulling wire to move along the length direction close to the lower connecting rod, the rear unlocking slider pushes the fourth limiting member to move along the radial direction of the rear lower rod and to compress the second elastic element until the extending end of the fourth limiting member retracts back into the rear lower rod, thus to release the limitation of the rear sliding end of the rear sliding upright rod sliding along the length direction close to the lower connecting rod.

The foldable trolley with convenient folding structure as described above, wherein the movable sleeve includes a pipe portion movably sleeved on the intermediate upright rod and a lifting handle arranged on the pipe portion at an end close to the upper folding frame.

The foldable trolley with convenient folding structure as described above, further comprising a wheel assembly, which includes a front wheel rack, a rear wheel rack and wheels mounted on the front wheel rack and the rear wheel rack, wherein one end of the front upper rod away from the intermediate upright rod and one end of the front lower rod away from the intermediate upright rod are hinged to the front wheel rack respectively; one end of the rear upper rod away from the intermediate upright rod and one end of the rear lower rod away from the intermediate upright rod are hinged to the rear wheel rack respectively.

The foldable trolley with convenient folding structure as described above, wherein the front wheel rack includes a front lower mounting portion, a front upper mounting portion, and a front wheel rack vertical rod connecting the front lower mounting portion and the front upper mounting portion, wherein the rear wheel rack includes a rear lower mounting portion, a rear upper mounting portion, and a rear wheel rack vertical rod connecting the rear lower mounting portion and the rear upper mounting portion.

Compared with the existing technology, the present invention has the following advantages:

The present invention provides a foldable trolley with convenient folding structure, which comprises a foldable frame, wherein the foldable frame includes an upper folding frame that can be folded, a lower folding frame that can be folded, and a supporting rod assembly. The supporting rod assembly includes an intermediate upright rod between the upper connecting rod and the lower connecting rod, and a front sliding upright rod and a rear sliding upright rod arranged on both sides of the intermediate upright rod. One end of the front sliding upright rod and one end of the rear sliding upright rod are hinged with the intermediate rod respectively, and the other ends of the both are slidably connected with the front lower rod and the rear lower rod respectively. The sliding ends of both the front sliding upright rod and the rear sliding upright rod slide closely as the lower folding frame is folded, or slide backwardly as the lower folding frame is expanded, thus to form a triangular support arm structure finally, so that the supporting strength, connecting strength and stability of overall structure of the trolley are improved after the lower folding frame is expanded, therefore the safety performance is better, which can avoid the safety problems caused by the fact that only the intermediate upright rod supporting the frame makes the intermediate upright rod easy to damage and break. Besides, a folding lock-release mechanism is provided in the present invention. When the foldable frame is expanded, the front sliding upright rod and the rear sliding upright rod are limited to slide by means of the front locking assembly and the rear locking assembly of the folding lock-release mechanism respectively, which can avoid causing injuries to children caused by unstable trolleys since the trolleys may be automatically folded when the hand-pushed trolleys are passed through uneven ground. When the foldable frame is folded, the front locking assembly and the rear locking assembly release limitations of the front sliding upright rod and the rear sliding upright rod respectively by means of the unlocking assembly of the folding lock-release mechanism, the foldable frame can be folded by simply lining the upper connecting rod up, thus one key locking or unlocking is achieved, and the operation is convenient.

BRIEF DESCRIPTION OF DRAWINGS

In order to explain the technical solutions in the embodiment of the present invention more clearly, the accompanying drawings needed in the description of the embodiment will be briefly introduced hereafter.

DETAILED DESCRIPTION OF THE EMBODIMENTS

In order to make the technical problems, technical solutions and beneficial effects solved by the present invention more clearly, the present invention is further illustrated hereafter in combination with the drawings and embodiments. It should be understood that the embodiments described here are only used to explain the present invention but not to limit the present invention.

When ordinal numerals such as "first" and "second", are referred in the embodiments of the present invention, unless it really means sequences in the context, it should be understood as merely for the purpose of distinction.

In the descriptions of the present invention, it should be noted that unless otherwise clearly defined and limited, the terms "arrange", "connect to", "connect with" should be understood in a broad sense. For example, it can be fixedly connected, detachably connected, or integrally connected. It can be mechanically connected or electrically connected; it can be directly connected or indirectly connected through an intermediate medium, or it can be the internal communication of two elements. For those skilled in the art, the specific meanings of the above terms in the present invention can be understood in specific circumstances.

Figure 1:
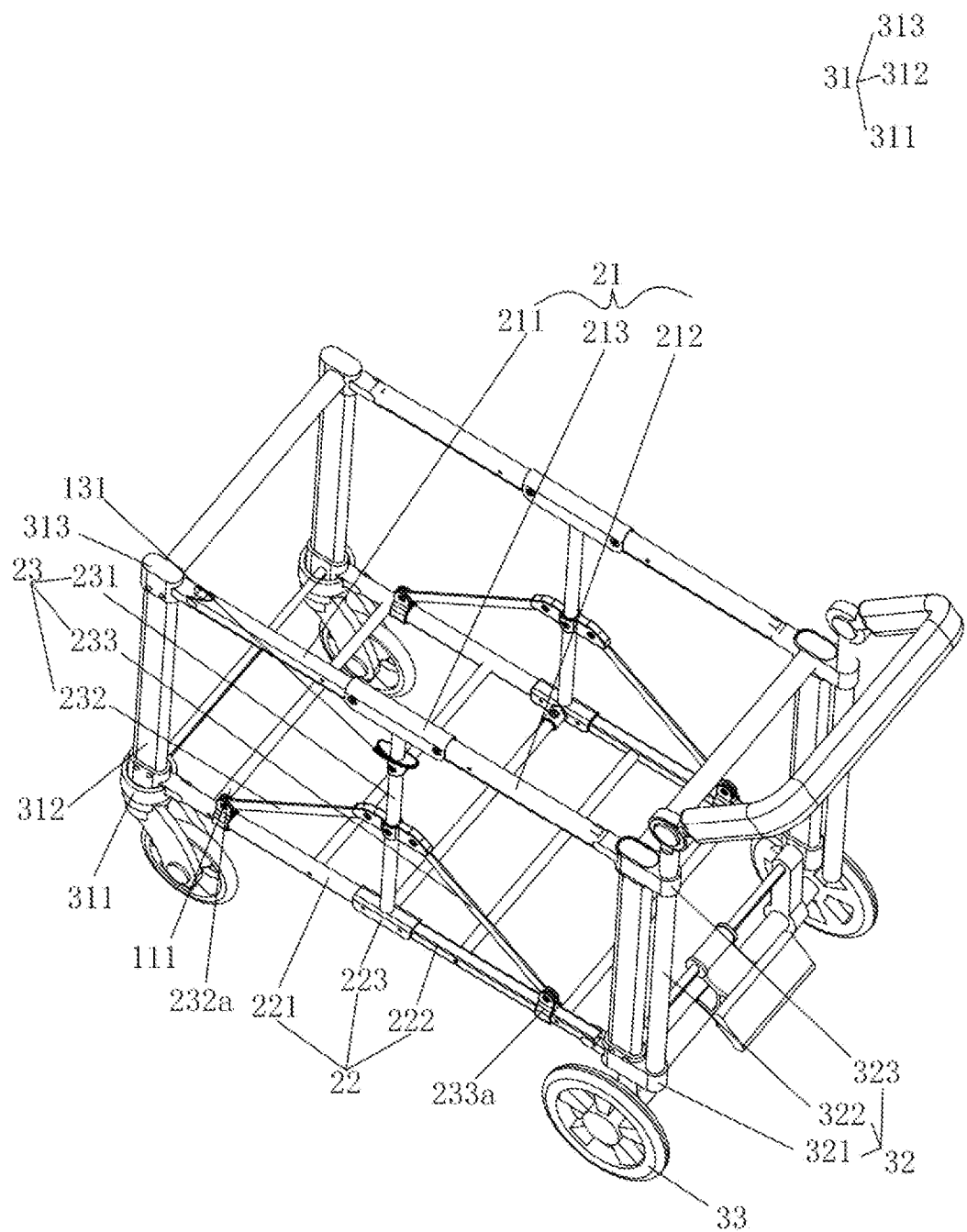
FIG. 1 is a schematic structure view of a foldable trolley with convenient folding structure after being expanded according to the present invention.
Figure 2:
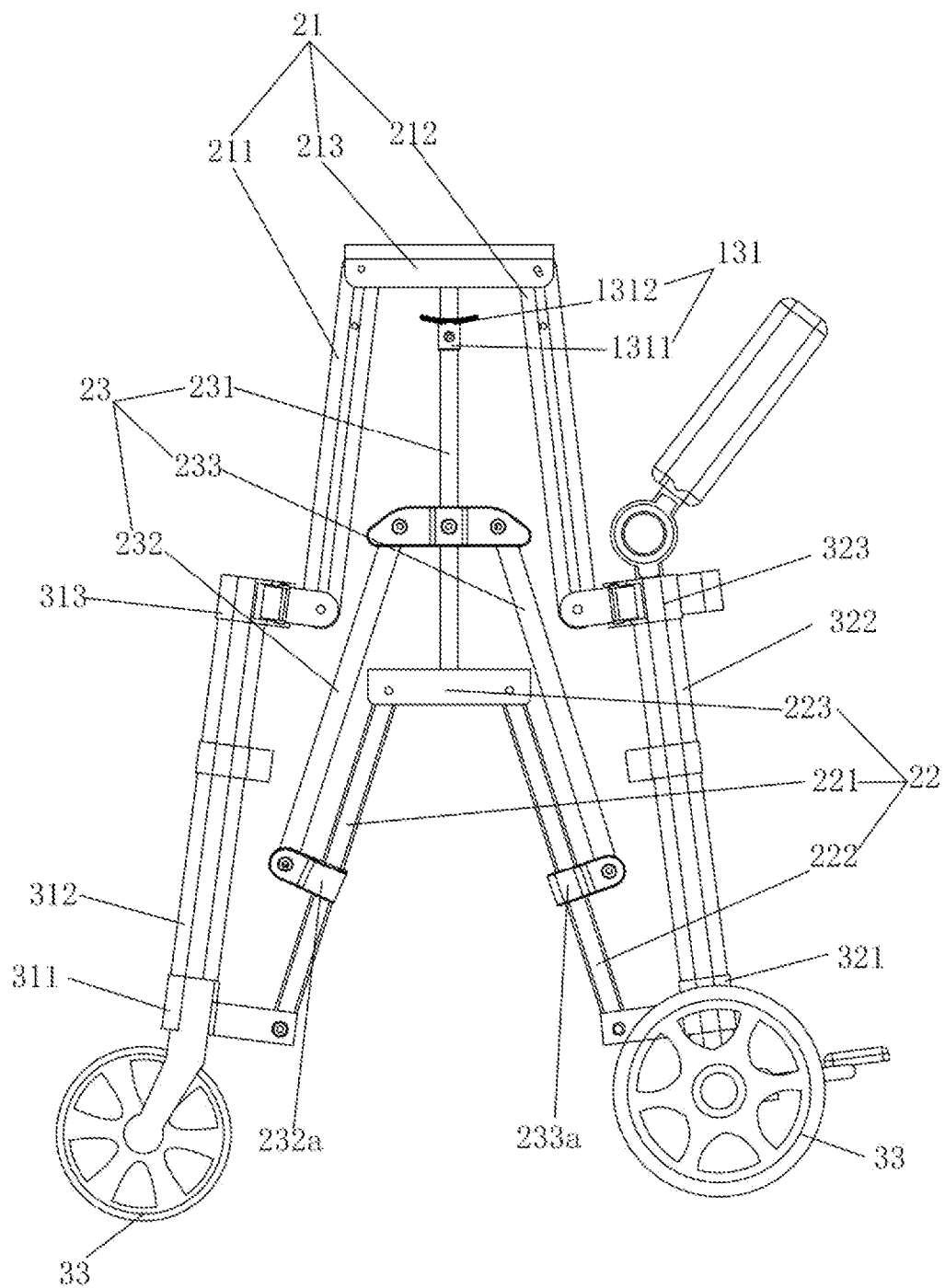
FIG. 2 is a schematic structure view of the foldable trolley with convenient folding structure after being folded according to the present invention.
Figure 3:
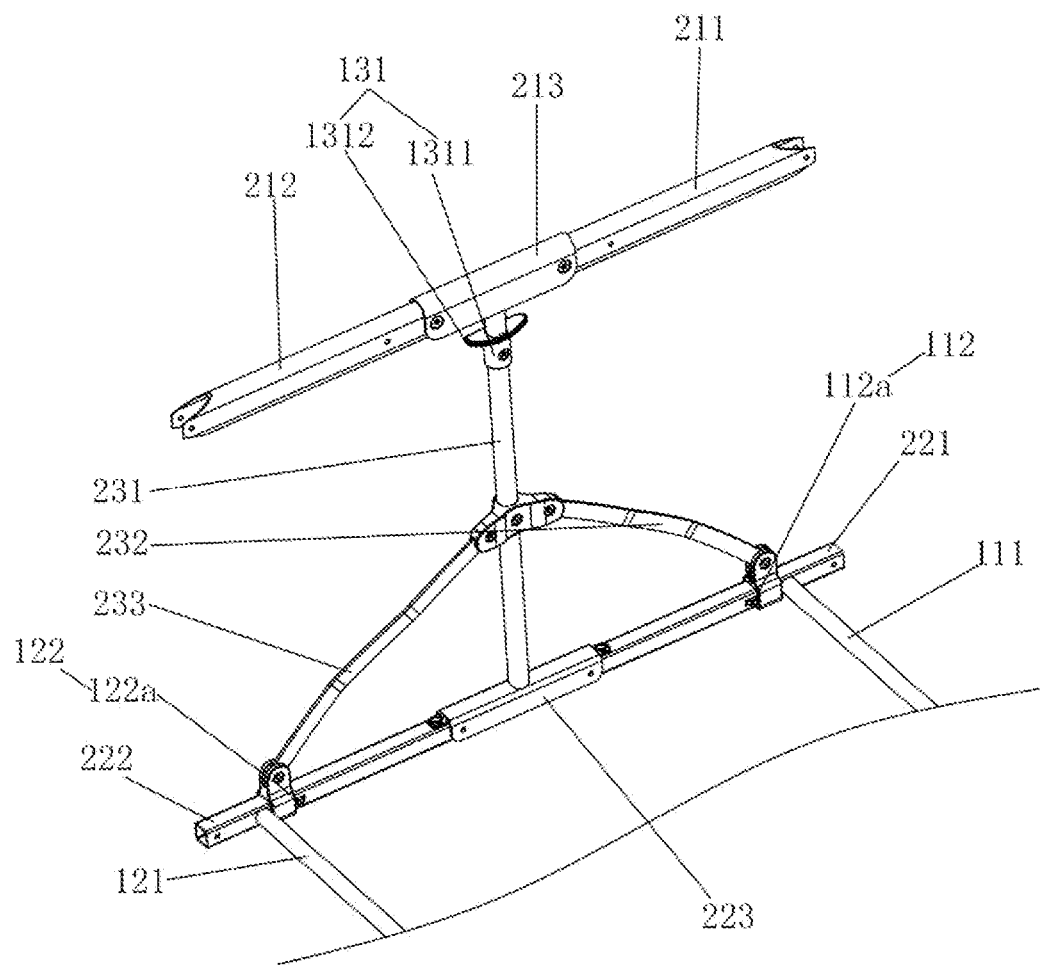
FIG. 3 is a partial structure view of the present invention.
Figure 4:
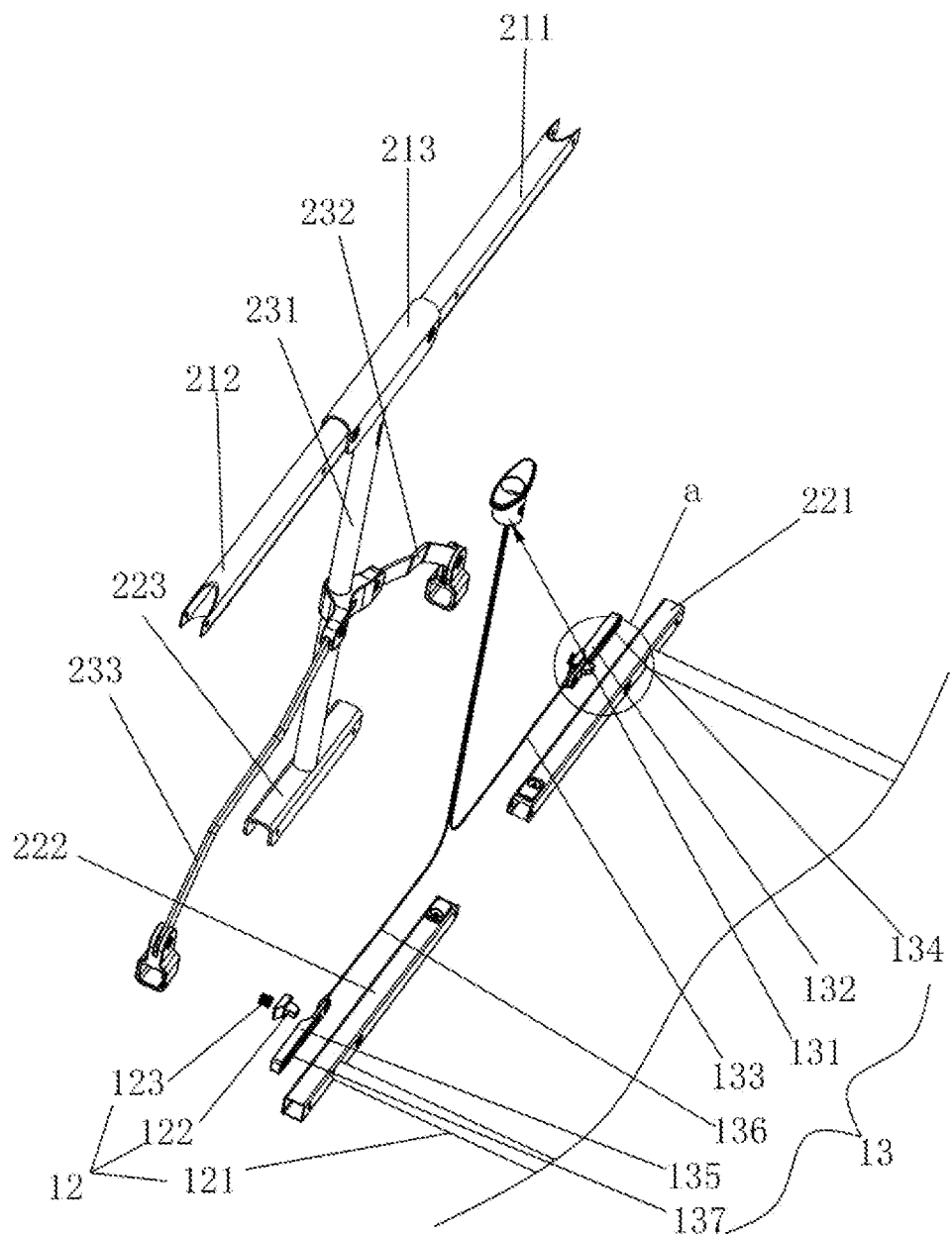
FIG. 4 is an exploded structure view of FIG. 3.
Figure 5:
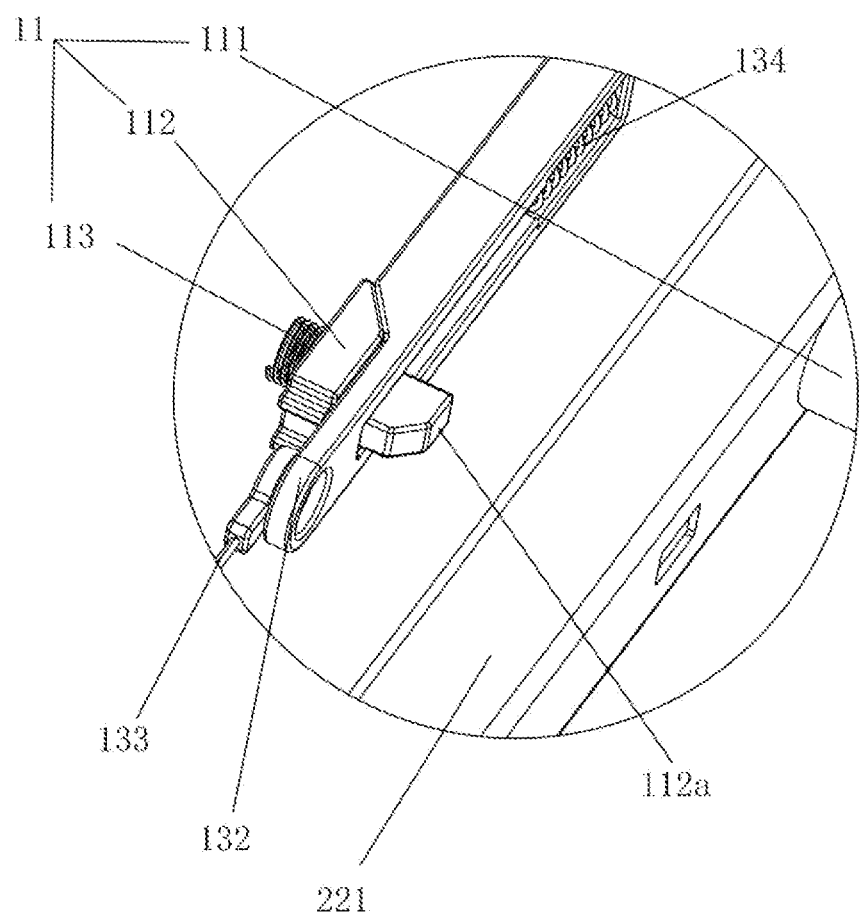
FIG. 5 is a partial enlarged view of Part a in FIG. 4.

In the present embodiment, as shown in FIGS. 1-5, a foldable trolley with convenient folding structure comprises a foldable frame and a folding lock-release mechanism. The foldable frame includes an upper folding frame 21, a lower folding frame 22, and a support rod assembly 23. The upper folding frame 21 includes a front upper rod 211, a rear upper rod 212, and an upper connecting rod 213 hinged with the front upper rod 211 and the rear upper pole 212 respectively. The lower folding frame 22 includes a front lower rod 221, a rear lower rod 222, and a lower connecting rod 223 hinged with the front lower rod 221 and the rear lower rod 222 respectively. The supporting rod assembly 23 includes an intermediate upright rod 231 arranged between the upper folding frame 21 and the lower folding frame 22, a front sliding upright rod 232 and a rear sliding upright rod 233 arranged on both sides of the intermediate upright rod 231 respectively. One end of the front sliding upright rod 232 is hinged with the intermediate upright rod 231, and the other end (front sliding end 232a) is slidably arranged on the front lower rod 221 along a length direction of the front lower rod 221. One end of the rear sliding upright rod 233 is hinged with the intermediate upright rod 231, and the other end (rear sliding end 233a) is slidably arranged on the rear lower rod 222 along a length direction of the rear lower rod 222.

The folding lock-release mechanism includes a front locking assembly 11 used for limiting the front sliding upright rod 232 to slide along the length direction of the front lower rod 221, a rear locking assembly 12 used for limiting the rear sliding upright rod 233 to slide along the length direction of the rear lower rod 222, and an unlocking assembly 13 used for unlocking the front locking assembly 11 and the rear locking assembly 12. The sliding ends of both the front sliding upright rod and the rear sliding upright rod slide closely as the lower folding frame is folded, or slide backwardly as the lower folding frame is expanded, thus to form a triangular support arm structure finally, so that the supporting strength, connecting strength and stability of overall structure of the trolley are strengthened after the lower folding frame is expanded, therefore the safety performance is better, which can avoid the safety problems caused by the fact that only the intermediate upright rod supporting the frame makes the intermediate upright rod easy to damage and break. Besides, a folding lock-release mechanism is provided in the present invention. When the foldable frame is expanded, the front sliding upright rod and the rear sliding upright rod are limited to slide respectively by means of the front locking assembly and the rear locking assembly of the folding lock-release mechanism. When the foldable frame is to be folded, the front locking assembly and the rear locking assembly release limitations of the front sliding upright rod and the rear sliding upright rod respectively by means of the unlocking assembly of the folding lock-release mechanism, the foldable frame can be folded by simply lifting the upper connecting rod up, thus one key locking or unlocking is achieved, and the operation is convenient.

Specifically, the front locking assembly 11 includes a first limiting member 111, a second limiting member 112, and a first elastic element 113. The first limiting member 111 is arranged on the front lower rod 221 and used for limiting the front sliding end 232a of the front sliding upright rod 232 to slide along a direction away from the lower connecting rod 223. The second limiting member 112 is arranged within the front lower rod 221, and one end of the second limiting member 112 movably extends out of the front lower rod 221 radially for limiting the front sliding end 232a of the front sliding upright rod 232 to slide along the direction close to the lower connecting rod 223. The first elastic element 113 is arranged between the front lower rod 221 and the second limiting member 112 and is used for pushing the second limiting member 112 along the radial direction of the front lower rod 221, so that the extending end 112a of the second limiting member 112 is kept outside the front lower rod 221. The first elastic element 113 adopts a return spring. When the lower folding frame 22 is to be expanded, the front sliding end 232a of the front sliding upright rod 232 slides to a position between the first limiting member 111 and the extending end 112a of the second limiting member 112, thus to fix the front sliding end 232a of the front sliding upright rod 232, so that the lower folding frame 22 maintains as a triangular support arm structure, which is more stable and can prevent the lower folding frame 22 from automatically retracting.

In addition, the rear locking assembly 12 includes a third limiting member 121, a fourth limiting member 122 and a second elastic element 123. The third limiting member 121 is arranged on the rear lower rod 222 and used for limiting the rear sliding end 233a of the rear sliding upright rod 233 to slide along a direction away from the lower connecting rod 223. The fourth limiting member 122 is arranged within the rear lower rod 222, and one end thereof movably extends out of the rear lower rod 222 radially for limiting the rear sliding end 233a of the rear sliding upright rod 233 to slide along the direction close to the lower connecting rod 223. The second elastic element 123 is arranged between the rear lower rod 222 and the fourth limiting member 122 and is used for pushing the fourth limiting member 122 radially along the radial direction of the rear lower rod 222, so that the extending end 122a of the fourth limiting member 122 is kept outside the rear lower rod 222. The second elastic element 123 adopts a return spring. When the lower folding frame 22 is to be expanded, the rear sliding end 233a of the rear sliding upright rod 233 slides to a position between the third limiting member 121 and the extending end 122a of the fourth limiting member 122, thus to fix the rear sliding end 233a of the rear sliding upright rod 233, so that the lower folding frame 22 maintains as a triangular support arm structure, which is more stable and can prevent the lower folding frame 22 from automatically folding.

Furthermore, the unlocking assembly 13 includes a movable sleeve 131, a front unlocking slider 132, a front pulling wire 133, a third elastic element 134, a rear unlocking slider 135, a rear pulling wire 136, and a fourth elastic element 137. The movable sleeve 131 is movably sleeved on the intermediate upright rod 231 along a length direction of the intermediate upright rod 231. The front unlocking slider 132 is movably arranged within the front lower rod 221 along the length direction of the front lower rod 221. The extending end 112a of the second limiting member 112 passes through the front unlocking slider 132 and then extends out of the front lower rod 221. The front unlocking slider 132 is matched with the second limiting member 112 by inclined wedge. One end of the front pulling wire 133 is connected with the movable sleeve 131, and the other end is connected with the front unlocking slider 132. The third elastic element 134 is arranged between the front unlocking slider 132 and the front lower rod 221. When the front unlocking slider 132 moves along a direction close to the lower connecting rod 223, the third elastic element 134 is compressed. The third elastic element 134 adopts a return spring, and when the movable sleeve 131 is released, the third elastic element 134 resets the front unlocking slider 132.

The rear unlocking slider 135 is movably arranged within the rear lower rod 222 along the length direction of the rear lower rod 222. The extending end 112a of the fourth limiting member 122 passes through the rear unlocking slider 135 and then extends out of the rear lower rod 222. The rear unlocking slider 135 is matched with the fourth limiting member 122 by inclined wedge. One end of the rear pulling wire 136 is connected with the movable sleeve 131, and the other end is connected with the rear unlocking slider 135. The fourth elastic element 137 is arranged between the rear unlocking slider 135 and the rear lower rod 222. When the rear unlocking slider 135 moves along a direction close to the lower connecting rod 223, the fourth elastic element 137 is compressed. The fourth elastic element 137 adopts a return spring, and when the movable sleeve 131 is released, the fourth elastic element 137 resets the rear unlocking slider 135.

When the foldable frame needs to be folded, the movable sleeve 131 is raised up. When the movable sleeve 131 moves along a direction close to the upper folding frame 21, the front unlocking slider 132 is pulled by the front pulling wire 133 to move along a direction close to the lower connecting rod 223, and the front unlocking slider 132 pushes the second limiting member 112 to move along the radial direction of the front lower rod 221 and to compress the first elastic element 113 until the extending end 112a of the second limiting member 112 retracts back into the front lower rod 221, thus to release the limitation of the front sliding end 232a of the front sliding upright rod 232 sliding along the direction close to the lower connecting rod 223. Similarly, when the movable sleeve 131 moves along a direction close to the upper folding frame 21, the rear unlocking slider 135 is pulled by the rear pulling wire 136 to move along a the direction close to the lower connecting rod 223, and the rear unlocking slider 135 pushes the fourth limiting member 122 to move along the radial direction of the rear lower rod 222 and to compress the second elastic element 123 until the extending end 122a of the fourth limiting member 122 retracts back into the rear lower rod 222, thus to release the limitation of the rear sliding end 233a of the rear sliding upright rod 233 sliding along the direction close to the lower connecting rod 223, so that the sliding ends of both the front sliding upright rod 232 and the rear sliding upright rod 233 can slide along the direction close to the lower connecting rod 223 as the from lower rod 221 and the rear lower rod 222 move towards each other, thereby achieving the whole trolley folding.

More specifically, the movable sleeve 131 includes a pipe portion 1311 movably sleeved on the intermediate upright rod 231, and a lifting handle 1312 arranged on the pipe portion 1311 at an end close to the upper folding frame 21. When folding, users only need to hold a position of the upper connecting rod 213 and to lift the lifting handle 1312 to drive the unlocking assembly 13, thus to release the limitations of the front locking assembly 11 and the rear locking assembly 12 on the front sliding upright rod 232 and the rear sliding upright rod 233 respectively, so the trolley can be folded by lifting the upper connecting rod 213 at this moment, thus the operation is more convenient.

Furthermore, the foldable trolley with convenient folding structure in the present invention further comprises a wheel assembly, wherein the wheel assembly includes a front wheel rack 31, a rear wheel rack 32, and wheels 33 mounted on the front wheel rack 31 and the rear wheel rack 32. One end of the front upper rod 211 away from the intermediate upright rod 231 and one end of the front lower rod 221 away from the intermediate upright rod 231 are hinged to the front wheel rack 31 respectively. One end of the rear upper rod 212 away from the intermediate upright rod 231 and one end of the rear lower rod 222 away from the intermediate upright rod 231 are hinged to the rear wheel frame 32 respectively. The front wheel rack 31 is hinged with both the front upper rod 211 and the front lower rod 221, and the rear wheel rack 32 is hinged with both the rear upper rod 212 and the rear lower rod 222, so that the trolley can be folded, and thus the volume is greatly reduced.

Furthermore, the front wheel rack 31 includes a front lower mounting portion 311, a front upper mounting, portion 313, and a front wheel rack vertical rod 312 that connects the front lower mounting portion 311 and the front upper mounting portion 313. The rear wheel rack 32 includes a rear lower mounting portion 321, a rear upper mounting portion 323, and the rear wheel rack vertical rod 322 that connects the rear lower mounting portion 321 and the rear upper mounting portion 323. The above structural design is simple and reasonable, so that the folded overall volume is smaller.

The foldable frame described in the present invention is not only suitable for hand-pushing strollers, but also suitable for touring trolleys for transporting groceries or camping, or suitable for carrying appropriate weights of goods to the seaside or anywhere as well.

The above mentioned is an embodiment provided in combination with the specific contents. It is not determined that the specific embodiments of the present invention are limited to these descriptions. At the same time, due to different industry naming, it is not limited to the above naming, and not limited to the above English naming. Any methods and structures that are similar to the present invention, or any technical deductions or substitutions made under the premises of the present invention, should be regarded as the protection scope of the present invention.

What is claimed is:

1. A foldable trolley with convenient folding structure, comprising a foldable frame and a folding lock-release mechanism, wherein the foldable frame comprises:
    an upper folding frame, which includes a front upper rod, a rear upper rod, and an upper connecting rod hinged with the front upper rod and the rear upper rod respectively;

a lower folding frame, which includes a front lower rod, a rear lower rod, and a lower connecting rod hinged with the front lower rod and the rear lower rod respectively;

a support rod assembly, which includes an intermediate upright rod arranged between the upper folding frame and the lower folding frame, and a front sliding upright rod and a rear sliding upright rod arranged on both sides of the intermediate upright rod respectively; wherein one end of the front sliding upright rod is hinged with the intermediate upright rod, and the other end, a front sliding end is slidably arranged on the front lower rod along a length direction of the front lower rod; one end of the rear sliding upright rod is hinged with the intermediate upright rod, and the other end, a rear sliding end is slidably arranged on the rear lower rod along a length direction of the rear lower rod, wherein the folding lock-release mechanism includes a front locking assembly for limiting the front sliding upright rod to slide along the length direction of the front lower rod, a rear locking assembly for limiting the rear sliding upright rod to slide along the length direction of the rear lower rod, and an unlocking assembly for unlocking the front locking assembly and the rear locking assembly.

2. The foldable trolley with convenient folding structure according to claim 1, wherein the front locking assembly comprises:

a first limiting member, which is arranged on the front lower rod for limiting the front sliding end of the front sliding upright rod to slide along the length direction away from the lower connecting rod;

a second limiting member, which is arranged within the front lower rod, wherein one end of the second limiting member movably extends out of the front lower rod along a radial direction of the front lower rod for limiting the front sliding end of the front sliding upright rod to slide along the length direction close to the lower connecting rod;

a first elastic element, which is arranged between the front lower rod and the second limiting member for pushing the second limiting member along the radial direction of the front lower rod, so that an extending end of the second limiting member is kept outside the front lower rod, when the lower folding frame is expanded, the front sliding end of the front sliding upright rod slides to a position between the first limiting member and the extending end of the second limiting member, thus to fix the front sliding end of the front sliding upright rod.

3. The foldable trolley with convenient folding structure according to claim 2, wherein the rear locking assembly comprises:

a third limiting member, which is arranged on the rear lower rod for limiting the rear sliding end of the rear sliding upright rod to slide along the length direction far away from the lower connecting rod;

a fourth limiting member, which is arranged within the rear lower rod, wherein one end of the fourth limiting member movably extends out of the rear lower rod along a radial direction of the rear lower rod for limiting the rear sliding end of the rear sliding upright rod to slide along the length direction close to the lower connecting rod;

a second elastic element, which is arranged between the rear lower rod and the fourth limiting member for pushing the fourth limiting member along the radial direction of the rear lower rod, so that an extending end of the fourth limiting member is kept outside the front lower rod, when the lower folding frame is expanded, the rear sliding end of the rear sliding upright rod slides to a position between the third limiting member and the extending end of the fourth limiting member, thus to fix the rear sliding end of the rear sliding upright rod.

4. The foldable trolley with convenient folding structure according to claim 3, wherein the unlocking assembly comprises:

a movable sleeve, which is movably arranged on the intermediate upright rod along a length direction of the intermediate upright rod;

a front unlocking slider, which is movably arranged within the front lower rod along the length direction oldie front lower rod, wherein, the extending end of the second limiting member passes through the front unlocking slider and then extends out of the front lower rod, and the front unlocking slider is matched with the second limiting member by inclined wedge;

a front pulling wire, whose one end is connected with the movable sleeve, and the other end is connected with the front unlocking slider;

a third elastic element, which is arranged between the front unlocking slider and the front lower rod, wherein the third elastic element is compressed when the front unlocking slider moves along the length direction close to the lower connecting rod, when the movable sleeve moves along a direction close to the upper folding frame, the front unlocking slider is pulled by the front pulling wire to move along the length direction close to the lower connecting rod, the front unlocking slider pushes the second limiting member to move along the radial direction of the front lower rod and to compress the first elastic element until the extending end of the second limiting member retracts back into the front lower rod, thus to release the limitation of the front sliding end of the front sliding upright rod sliding along the length direction close to the lower connecting rod.

5. The foldable trolley with convenient folding structure according to the claim 4, wherein the unlocking assembly further comprises:

a rear unlocking slider, which is movably arranged within the rear lower rod along the length direction of the rear lower rod, wherein the extending end of the fourth limiting member passes through the rear unlocking slider and then extends out of the rear lower rod, and the rear unlocking slider is matched with the fourth limiting member by inclined wedge;

a rear pulling wire, whose one end is connected with the movable sleeve, and the other end is connected with the rear unlocking slider;

a fourth elastic element, which is arranged between the rear unlocking slider and the rear lower rod, wherein the fourth elastic element is compressed when the rear unlocking slider moves along the length direction close to the lower connecting rod, when the movable sleeve moves along a direction close to the upper folding frame, the rear unlocking slider is pulled by the rear pulling wire to move along the length direction close to the lower connecting rod, the rear unlocking slider pushes the fourth limiting member to move along the radial direction of the rear lower rod and to compress the second elastic element until the extending end of the fourth limiting member retracts back into the rear lower rod, thus to release the limitation of the rear sliding end of the rear sliding upright rod sliding along the length direction close to the lower connecting rod.

6. The foldable trolley with convenient folding structure according to claim 5, wherein the movable sleeve includes a pipe portion movably sleeved on the intermediate upright rod and a lifting handle arranged on the pipe portion at an end close to the upper folding frame.

7. The foldable trolley with convenient folding structure according to claim 1, further comprising a wheel assembly, which includes a front wheel rack, a rear wheel rack and wheels mounted on the front wheel rack and the rear wheel rack, wherein one end of the front upper rod away from the intermediate upright rod and one end of the front lower rod away from the intermediate upright rod are hinged to the front wheel rack respectively; one end of the rear upper rod away from the intermediate upright rod and one end of the rear lower rod away from the intermediate upright rod are hinged to the rear wheel rack respectively.

8. The foldable trolley with convenient folding structure according to claim 7, wherein the front wheel rack includes a front lower mounting portion, a front upper mounting portion, and a front wheel rack vertical rod connecting the front lower mounting portion and the front upper mounting portion, wherein the rear wheel rack includes a rear lower mounting portion, a rear upper mounting portion, and a rear wheel rack vertical rod connecting the rear lower mounting portion and the rear upper mounting portion.

\* \* \* \* \*